United States Patent
Yan et al.

(10) Patent No.: US 11,618,361 B2
(45) Date of Patent: Apr. 4, 2023

(54) BASS AUTOMOBILE SEAT MODULE AND AUTOMOBILE

(71) Applicant: AAC Microtech (Changzhou) Co., Ltd., Changzhou (CN)

(72) Inventors: Xudong Yan, Shenzhen (CN); Tao Shao, Shenzhen (CN); Xiaojiang Gu, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/560,273

(22) Filed: Dec. 23, 2021

(65) Prior Publication Data

US 2022/0348124 A1 Nov. 3, 2022

(30) Foreign Application Priority Data

Apr. 30, 2021 (CN) .......................... 202120938307.1

(51) Int. Cl.
*B60N 2/90* (2018.01)
*H04R 1/02* (2006.01)

(52) U.S. Cl.
CPC ............... *B60N 2/90* (2018.02); *H04R 1/025* (2013.01); *H04R 2499/13* (2013.01)

(58) Field of Classification Search
CPC ....... B60N 2/90; H04R 1/025; H04R 2499/13
USPC .............................................. 381/86
See application file for complete search history.

(56) References Cited

U.S. PATENT DOCUMENTS

| 8,792,666 B2 * | 7/2014 | Koike | H04S 7/303 381/302 |
| 10,820,103 B1 * | 10/2020 | Hudson, III | H04R 5/023 |
| 11,228,825 B1 * | 1/2022 | Hudson, III | H04R 1/025 |
| 2007/0058824 A1 * | 3/2007 | Aylward | H04R 1/028 381/152 |
| 2021/0168504 A1 * | 6/2021 | Corynen | H04R 1/403 |

* cited by examiner

*Primary Examiner* — Sean H Nguyen
(74) *Attorney, Agent, or Firm* — W&G Law Group

(57) ABSTRACT

The present invention provides a bass automobile seat module and an automobile. The bass automobile seat module includes a seat and a speaker box mounted at a bottom of the seat. The bottom of the seat is provided with a mounting slot; the speaker box includes a hollow shell arranged in the mounting slot and a double-sided sound module accommodated in the shell; the top and bottom of the double-sided sound module are respectively provided with a first vibration diaphragm and a second vibration diaphragm; and the first vibration diaphragm located in the mounting slot transmits a sound through the seat and a sound production channel of the double-sided sound module. The present invention can release a storage space of a door and can also automatically offset the resonance, which is convenient for providing a better listening effect.

18 Claims, 5 Drawing Sheets

A-A

B-B

BASS AUTOMOBILE SEAT MODULE AND AUTOMOBILE

TECHNICAL FIELD

The present invention relates to the acoustoelectric technical field, in particular to a bass automobile seat module and an automobile.

BACKGROUND

With the rapid development of automobiles, the technology of applying BOX modules to automobiles is constantly innovated to adapt to different users. The existing BOX module is usually mounted on a door or below an automobile chassis. The BOX module generally includes a BOX upper cover, a lower cover, and a single-sided sound production unit. Single-sided sound production is performed through the single-sided sound production unit. Since it is only equipped with the single-sided sound production monomer, the BOX module mounted below a seat will generate greater Z-directional vibration, which will make a driver discomfortable and bring a poor listening experience. At the same time, the BOX is mounted on the automobile chassis, so it will occupy a space for rear passengers to stretch their feet.

SUMMARY

The present invention aims to provide a bass automobile seat module convenient for releasing a storage space on a door and having a good sound production effect.

In order to achieve the above objective, the present invention provides a bass automobile seat module including a seat and a speaker box mounted at a bottom of the seat, wherein the bottom of the seat is provided with a mounting slot; the speaker box comprises a hollow shell arranged in the mounting slot and a double-sided sound module accommodated in the shell; the top and bottom of the double-sided sound module are respectively provided with a first vibration diaphragm and a second vibration diaphragm; and the first vibration diaphragm located in the mounting slot transmits a sound through the seat and a sound production channel of the double-sided sound module.

Preferably, the first vibration diaphragm and the second vibration diaphragm have opposite vibration directions within the same time.

Preferably, the first vibration diaphragm and the second vibration diaphragm have consistent vibration intensities.

Preferably, the shell and a slot side wall of the mounting slot form a sound guide channel in a spacing manner.

Preferably, the speaker box further comprises two sound holes which run through two opposite sides of the shell along a slot depth direction of the mounting slot; one side of the shell close to the slot bottom of the mounting slot is sunken to form an avoiding slot, and the sound hole close to the slot bottom of the mounting slot is located in the avoiding slot; and the sound guide channel communicates the avoiding slot with the outside.

Preferably, two sound outlet surfaces of the double-sided sound module respectively face the two sound holes and cause the double-sided sound module and the shell to be jointly encircled into a rear sound production cavity.

Preferably, the seat comprises a seat surface and a bottom surface opposite to the seat surface; the mounting slot comprises a first mounting slot formed in a center position on the bottom surface of the seat and a plurality of second mounting slots sunken from the slot side wall of the first mounting slot towards a center direction away from the first mounting slot; the shell comprises a main body mounted in the first mounting slot and a plurality of connection parts which extend from the main body and are respectively assembled in the plurality of second mounting slots; and the sound holes are formed in the center position of the main body in a penetration manner.

Preferably, a plurality of first fixing holes are formed in the second mounting slots; a plurality of second fixing holes corresponding to the first fixing holes are formed in the connection parts; and the connection parts and the plurality of second mounting slots are fixedly connected in a manner that fixing rods pass through the second fixing holes and the first fixing holes.

Preferably, a plurality of gaskets are further arranged between the connection parts and the plurality of second mounting slots.

Preferably, four second mounting slots are provided, and the four second mounting slots are respectively arranged on the slot side wall of the first mounting slot at intervals with each other.

Preferably, the first mounting slot is of a rectangular structure, and the plurality of second mounting slots are of U-shaped structures and are uniformly arranged on two opposite sides of the first mounting slot.

Preferably, a first supporting boss and a second supporting boss which are spaced from each other along an axial direction of the sound holes are further arranged in the shell; a plurality of extending arms extending to the outside and a ringlike supporting part are arranged on a peripheral side of the double-sided sound module; the plurality of extending arms are fixedly arranged on the first supporting boss; and the ringlike supporting part is fixedly arranged on the second supporting boss.

Preferably, the double-sided sound module is further provided with a plurality of positioning blocks; the first supporting boss is inwards sunken to form a plurality of positioning slots; and the plurality of positioning blocks are cooperatively arranged in the plurality of positioning slots, respectively to realize positioning and mounting of the double-sided sound module.

The embodiments of the present invention further provide an automobile including the above said bass automobile seat module.

The present invention has the beneficial effects: the bottom surface of the seat is inwards sunken to form one mounting slot; and the speaker box is embedded into the mounting slot, which is convenient for releasing the storage space of the door. Since the speaker box includes the hollow shell arranged in the mounting slot and the double-sided sound module accommodated in the shell; the top and bottom of the double-sided sound module are respectively provided with a first vibration diaphragm and a second vibration diaphragm; and the first vibration diaphragm located in the mounting slot transmits the sound through the seat and the sound production channel of the double-sided sound module. By means of the double-sided sound module, resonance can be automatically offset, so that when it is mounted at the bottom of the seat, no vibration discomfort will be brought, and the experience effect of a user is enhanced.

Figure 1:
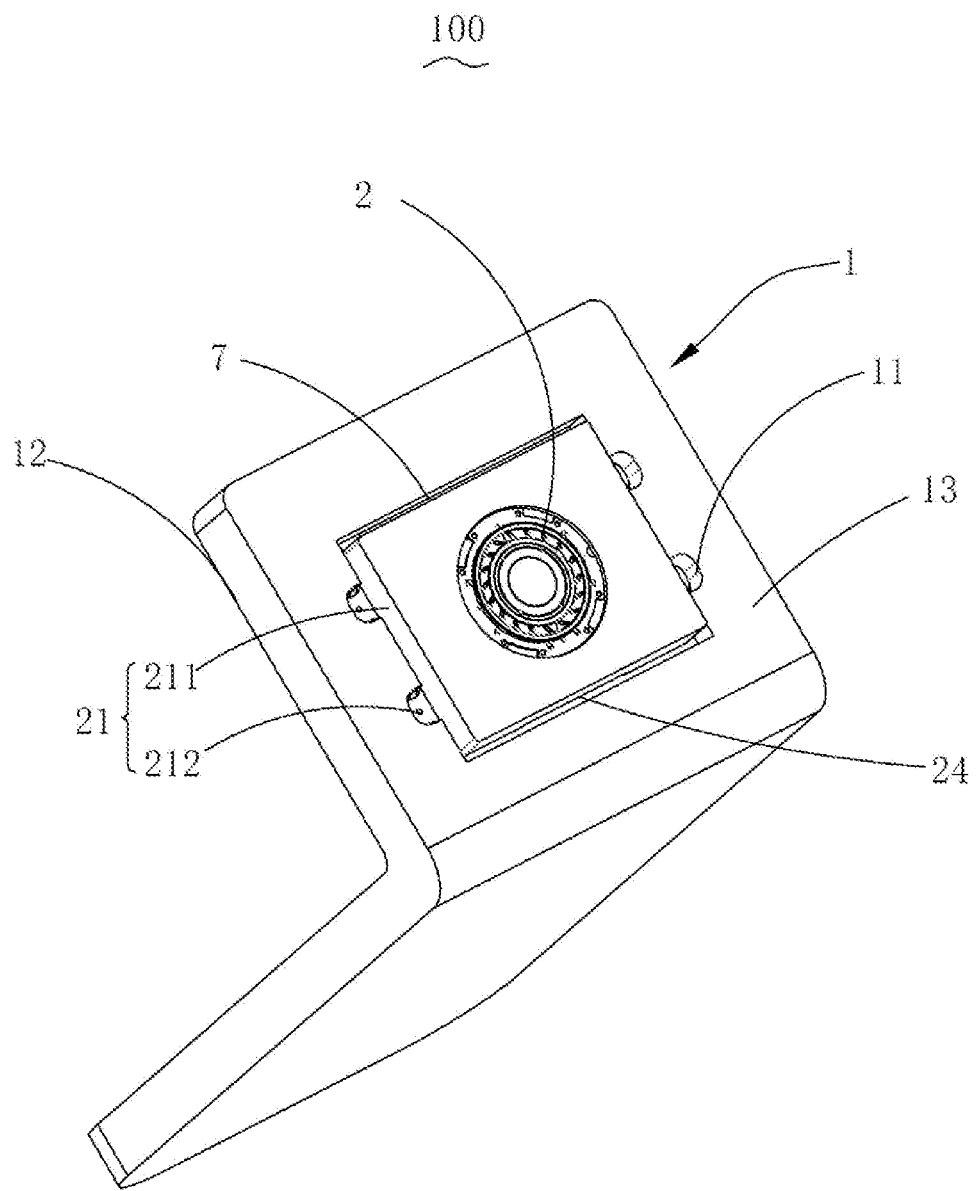
FIG. 1 is a schematic structural diagram of a bass automobile seat module of the embodiments of the present invention.

In the drawings: 100: speaker; 1: seat; 11: mounting slot; 111: first mounting slot; 112: second mounting slot; 113: slot side wall; 12: seat surface; 13: bottom surface; 2: speaker box; 21: shell; 211: main body; 212: connection part; 213: first supporting boss; 214: second supporting boss; 22: double-sided sound module; 221: positioning block; 222: extending wall; 223: ringlike supporting part; 224: first vibration diaphragm; 225: second vibration diaphragm; 23: gasket; 24: avoiding slot; 25: fixing rod; 26: sound hole; 3: first fixing hole; 4: second fixing hole; 5: third fixing hole; 6: positioning slot; and 7: sound guide channel.

DETAILED DESCRIPTION OF THE EMBODIMENTS

The present invention is further described below in detail in combination with the accompanying drawings and embodiments.

It should be noted that all directional indications (such as up, down, left, right, front, rear, inner, outer, top, bottom, . . . ) in the embodiments of the present invention are only used for explaining relative position relationships between all components at a certain specific attitude (as shown in the figures). If this specific position changes, the directional indication also correspondingly changes with it.

Figure 2:
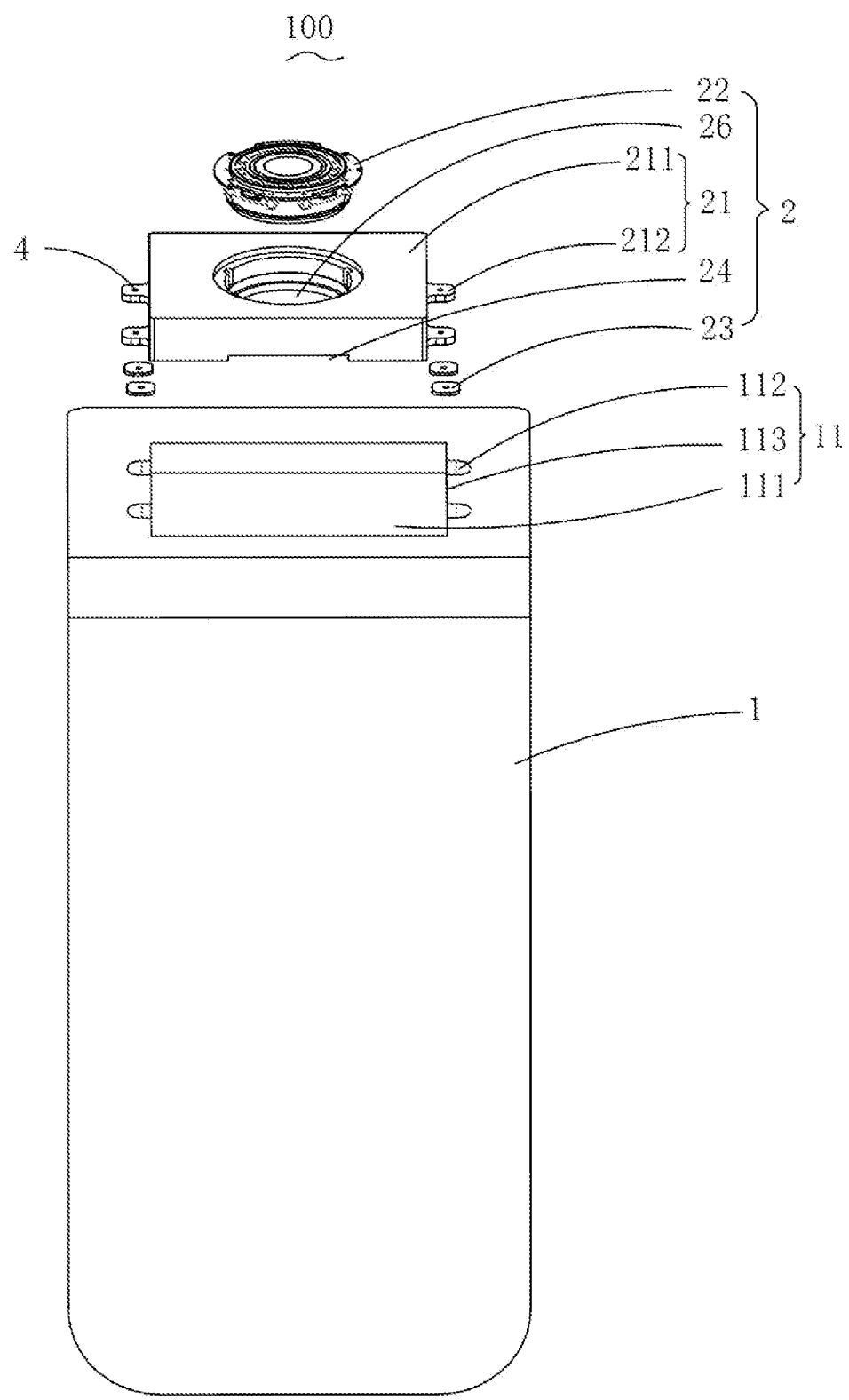
FIG. 2 is an exploded diagram of a bass automobile seat module of the embodiments of the present invention.
Figure 3:
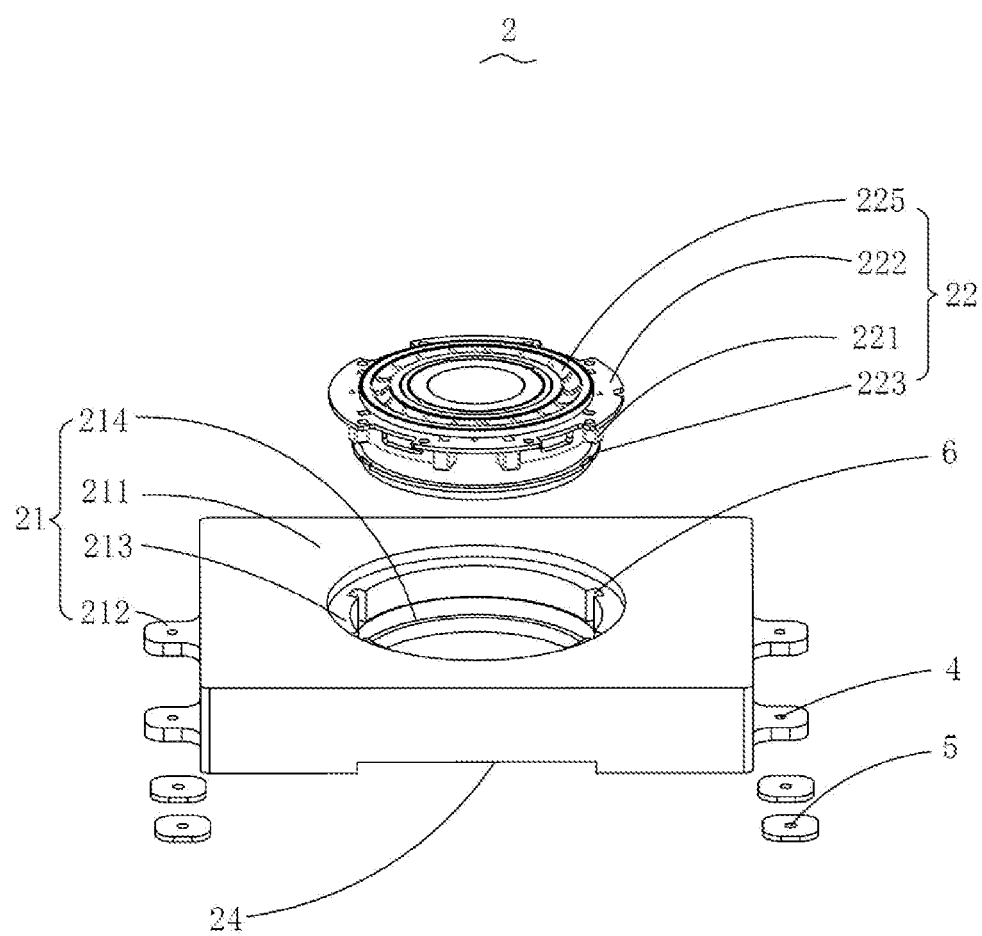
FIG. 3 is an exploded diagram of a speaker box of the embodiments of the present invention.
Figure 4:
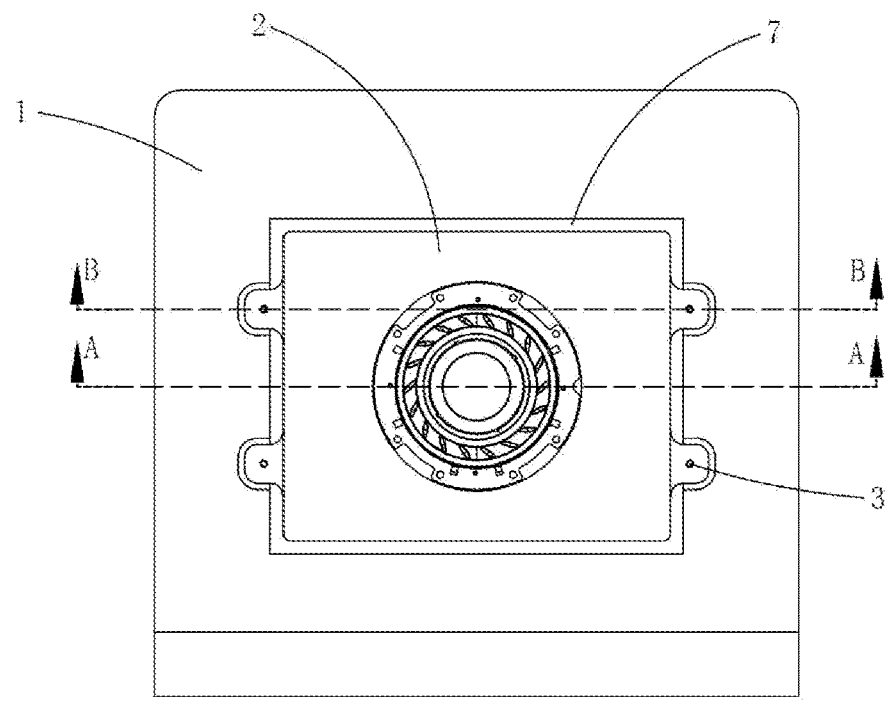
FIG. 4 is a top view of the embodiments of the present invention.
Figure 5:
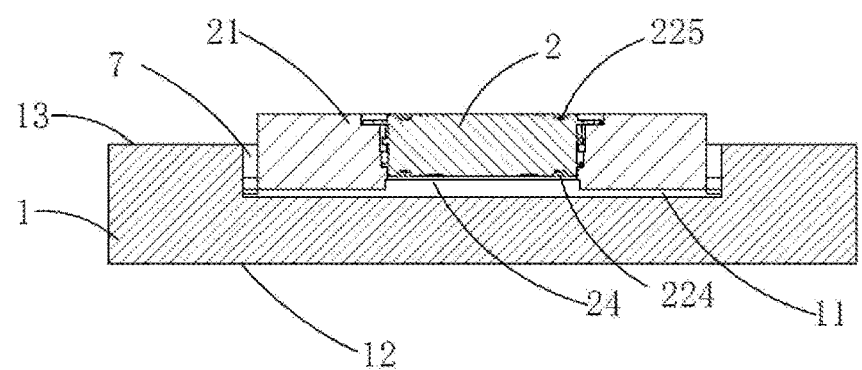
FIG. 5 is a cutaway view of FIG. 4 along the A-A direction.
Figure 6:
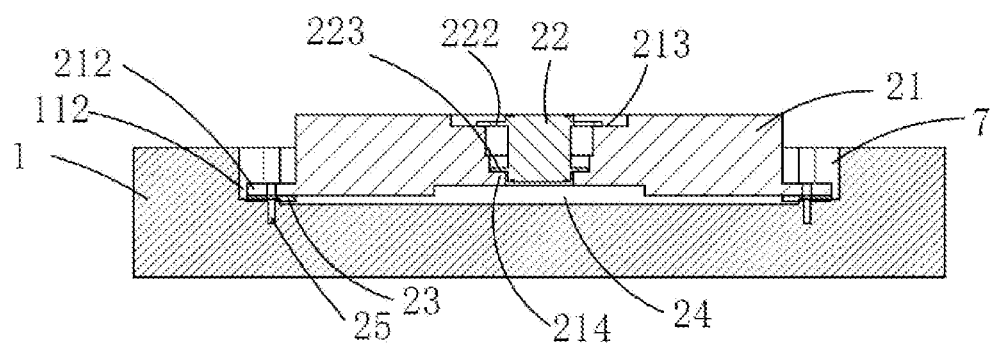
FIG. 6 is a cutaway view of FIG. 4 along the B-B direction.

Referring to FIG. 1 to FIG. 6, the present invention provides a bass automobile seat module 100 including a seat 1 and a speaker box 2 mounted at a bottom of the seat 1, wherein the bottom of the seat 1 is provided with a mounting slot 11; the speaker box 2 includes a hollow shell 21 arranged in the mounting slot 11 and a double-sided sound module 22 accommodated in the shell 21; the top and bottom of the double-sided sound module 22 are respectively provided with a first vibration diaphragm 224 and a second vibration diaphragm 225; and the first vibration diaphragm 224 located in the mounting slot 11 transmits a sound through the seat 1 and a sound production channel of the double-sided sound module 22. Two sound fields can be superposed, and the sound production effect is better. In this way, a storage space of a door is convenient to release. At the same time, the resonance can be offset by means of double-sided vibration of the first vibration diaphragm 224 and the second vibration diaphragm 225 so that after it is mounted at the bottom of the seat 1, the module will bring no vibration discomfort, and the experience effect of a user is enhanced.

In the present embodiment, the vibration directions of the first vibration diaphragm 224 and the second vibration diaphragm 225 within the same time are opposite. Accordingly, the resonance offset can be realized within the same time, and the experience effect is good.

In the present embodiment, the vibration intensities of the first vibration diaphragm 224 and the second vibration diaphragm 225 are consistent. Accordingly, the resonance can be completely offset so that a user on the seat 1 will not feel the vibration discomfort, thus bringing a better listening experience to a driver and passengers.

In the present embodiment, the shell 21 and a slot side wall of the mounting slot 11 form a sound guide channel 7 in a spacing manner.

In the present embodiment, the seat 1 includes a seat surface 12 and a bottom surface 13 opposite to the seat surface 12. The mounting slot 11 is formed by inwards sinking of the bottom surface 13. The speaker box 2 is embedded into the mounting slot 11. The speaker box 2 further includes two sound holes 26 which run through two opposite sides of the shell 21 along a slot depth direction of the mounting slot 11. Two sound outlet surfaces of the double-sided sound module 22 respectively face the two sound holes 26 and cause the double-sided sound module 22 and the shell 21 to be jointly encircled into a rear sound production cavity. One side of the shell close to the slot bottom of the mounting slot 11 is sunken to form an avoiding slot 24, and the sound hole 26 close to the slot bottom of the mounting slot 11 is located in the avoiding slot 24; and the sound guide channel 7 communicates the avoiding slot 24 with the outside.

The seat 1 may be a main driving seat, an auxiliary driving seat, or a rear seat. The speaker box 2 is embedded into the seat 1, thus improving the listening experience of a driver or a rear passenger.

The speaker box 2 is a bass BOX module which has a good vibration effect and good listening effect.

In particular, the bottom surface 13 of the seat 1 is inwards sunken to form one mounting slot 11, and the speaker box 2 is embedded into the mounting slot 11, which is convenient for releasing the storage space of the door. The speaker box 2 includes the hollow shell 21 embedded in the mounting slot 11, the two sound holes 26 running through the two opposite sides of the shell 21 along the slot depth direction of the mounting slot 11, and the double-sided sound module 22 accommodated and fixed in the shell 21. The two sound outlet surfaces of the double-sided sound module 22 respectively face the two sound holes 26 and cause the double-sided sound module 22 and the shell 21 to be jointly encircled into the rear sound production cavity. The rear sound production cavity is convenient for achieving a bass effect. The shell 21 and a slot side wall 113 of the mounting slot 11 form a sound guide channel 7 in a spacing manner, which is used for realizing sound production conduction. One side of the shell 21 close to the slot bottom of the mounting slot 11 is sunken to form the avoiding slot 24, and the sound hole 26 close to the slot bottom of the mounting slot 11 is located in the avoiding slot 24; and the sound guide channel 7 communicates the avoiding slot 24 with the outside. Therefore, the double-sided sound module can offset the resonance. When the module is mounted at the bottom of the seat, no vibration discomfort will be brought, thus bringing a better listening effect to the user.

In the present embodiment, the mounting slot 11 includes a first mounting slot 111 formed in a center position on the bottom surface 13 of the seat 1 and a plurality of second mounting slots 112 sunken from the slot side wall 113 of the first mounting slot 111 towards a center direction away from the first mounting slot 111; the shell 21 includes a main body 211 mounted in the first mounting slot 111 and a plurality of connection parts 212 which extend from the main body 21 and are respectively assembled in the plurality of second mounting slots 112; and the sound holes 26 are formed in the center position of the main body 211 in a penetration manner.

The first mounting slot 111 is formed in the geometric center position of the bottom surface 13 of the seat 1; the main body 211 of the shell 21 is mounted in the first mounting slot 111; the sound holes 26 are formed in the center position of the main body 211 in the penetration manner, that is, the double-sided sound module 22 is correspondingly arranged at the center position of the first mounting slot 111 so that the two sound outlet surfaces of the double-sided sound module 22 respectively correspond to the two sound holes 26, i.e., the seat 1 and the automobile chassis, thus achieving a double-sided sound production effect, and the listening experience of the user is good. By means of cooperatively mounting the connection parts 212 in the second mounting slots 112, the main body is supported and fixed at the bottom of the seat 1. The fixing effect on the main body 211 is good, thus enhancing the fixing of the double-sided sound module 22 and making the effect better when the double-sided sound module 22 vibrates.

The double-sided sound module 22 is arranged at the geometric center position of the main body 211 in the penetration manner, so that the sound production effect is uniform, and the user experience is good.

The depth of the slot bottom of the first mounting slot 111 is greater than the depth of the slot bottom of each second mounting slot 112 so that the main body 211 is communicated to the bottom of the seat 1, and the sound production effect is better.

In the present embodiment, first fixing holes 3 are formed in the plurality of second mounting slots 112; second fixing holes 4 corresponding to the first fixing holes 3 are formed in the connection parts 212; and the connection parts 212 and the plurality of second mounting slots 112 are fixedly connected in a manner that fixing rods 25 pass through the second fixing holes 4 and the first fixing holes 3. Accordingly, mounting and fixing between the connection parts 212 and the seat 1 are facilitated, so that the fixing effect on the main body 211 at the bottom of the seat 1 is better.

Alternatively, the first fixing holes 3 and the second fixing holes 4 may be threaded holes. The fixing rods 25 may be threaded rods. The main body 211 is fixed to the seat 1 by means of rotation of the threaded rods and the threaded holes. Meanwhile, since the fixing is realized by threads, the main body 211 and the seat 1 are convenient to remove, efficiently maintained or replaced, and convenient to use.

In the present embodiment, gaskets 23 are further cooperatively arranged between the connection parts 212 and the plurality of second mounting slots 112. By means of the gaskets 23, the fixing effect between the connection parts 212 and the second mounting slots 112 can be enhanced, and the stability is higher. The gaskets 23 are provided with third fixing holes 5. The fixing rods 25 pass through the second fixing holes 4, the third fixing holes 5, and the first fixing holes 3 in sequence for fixed connection.

In the present embodiment, four second mounting slots 112 are provided, and the four second mounting slots 112 are respectively arranged on the slot side wall 113 of the first mounting slot 111 at intervals with each other. Since there are four second mounting slots 112 which are respectively disposed on two sides of the first mounting slot 111 in pairs, the connection parts 212 of the shell 21 are correspondingly mounted in the second mounting slots 112 to conveniently limit the main body 211, thus avoiding the double-sided sound module 22 in the main body 211 from deviating during vibration.

Alternatively, the four second mounting slots 112 are also disposed on the other two sides of the first mounting slot 111 at intervals with each other. Specific positions can be selected according to an actual situation.

Of course, the number of the second mounting slots 112 is not only 4, and may be 5, 6, 7, 8, etc.

In the present embodiment, the first mounting slot 111 is of a rectangular structure, and the plurality of second mounting slots 112 are of U-shaped structures and are uniformly arranged on two opposite sides of the first mounting slot 111. The shell 21 is convenient to mount on the first mounting slot 111 and the second mounting slots 112.

In the present embodiment, a first supporting boss 213 and a second supporting boss 214 which are spaced from each other along an axial direction of the sound holes 26 are further arranged in the shell 21; a plurality of extending arms 222 extending to the outside and a ringlike supporting part 223 are arranged on a peripheral side of the double-sided sound module 22; the plurality of extending arms 222 are fixedly arranged on the first supporting boss 213; and the ringlike supporting part 223 is fixedly arranged on the second supporting boss 214. It is convenient for the double-sided sound module 22 to be fixed and mounted on the shell 21. At the same time, the plurality of extending arms 222 and the ringlike supporting part 223 are respectively arranged on the first supporting boss 213 and the second supporting boss 214 to make the fixing effect of the double-sided sound module 22 in the shell 21 better.

In the present embodiment, the double-sided sound module 22 is further provided with a plurality of positioning blocks 221; the first supporting boss 213 is inwards sunken to form a plurality of positioning slots 6; and the plurality of positioning blocks 221 are cooperatively arranged in the plurality of positioning slots 6, respectively to realize positioning and mounting of the double-sided sound module 22. In this way, it is convenient for the double-sided sound module 22 to be fixedly mounted in the shell 21, so that the speaker box 2 formed by the shell 21 and the sound production monomer 22 is embedded into the mounting slot 11 to save the mounting space of the automobile.

The embodiments of the present invention further provide an automobile including the above bass automobile seat module 100. Since the bass automobile seat module 100 is arranged in the automobile, the mounting holes are saved, and the sound production effect is good, thus providing the experience effect to the user.

Compared with the existing art, the present invention includes the seat 1 and the speaker box 2 mounted at the bottom of the seat 1. The bottom of the seat 1 is provided with the mounting slot 11; the speaker box 2 includes the hollow shell 21 arranged in the mounting slot 11 and the double-sided sound module 22 accommodated in the shell 21; the top and bottom of the double-sided sound module 22 are respectively provided with the first vibration diaphragm 224 and the second vibration diaphragm 225; and the first vibration diaphragm 224 located in the mounting slot 11 transmits the sound through the seat 1 and the sound production channel of the double-sided sound module 22. Two sound fields can be superposed, and the sound production effect is better. In this way, a storage space of a door is convenient to release. At the same time, the resonance can be offset by means of double-sided vibration of the first vibration diaphragm 224 and the second vibration diaphragm 225 so that after it is mounted at the bottom of the seat 1, the module will bring no vibration discomfort, and the experience effect of a user is enhanced.

The embodiments of the present invention are described above only. It should be noted that those of ordinary skill in the art can further make improvements without departing from the concept of the present invention. These improvements shall all fall within the protection scope of the present invention.

What is claimed is:

1. A bass automobile seat module comprising a seat and a speaker box mounted at a bottom of the seat,
wherein
the bottom of the seat is provided with a mounting slot; the speaker box comprises a hollow shell arranged in the mounting slot and a double-sided sound module accommodated in the shell; the top and bottom of the double-sided sound module are respectively provided with a first vibration diaphragm and a second vibration diaphragm; and the first vibration diaphragm located in the mounting slot transmits a sound through the seat and a sound production channel of the double-sided sound module.

2. The bass automobile seat module according to claim 1, wherein the first vibration diaphragm and the second vibration diaphragm have opposite vibration directions within the same time.

3. The bass automobile seat module according to claim 1, wherein the first vibration diaphragm and the second vibration diaphragm have consistent vibration intensities.

4. The bass automobile seat module according to claim 1, wherein the shell and a slot side wall of the mounting slot form a sound guide channel in a spacing manner.

5. The bass automobile seat module according to claim 4, wherein the speaker box further comprises two sound holes which run through two opposite sides of the shell along a slot depth direction of the mounting slot; one side of the shell close to the slot bottom of the mounting slot is sunken to form an avoiding slot, and the sound hole close to the slot bottom of the mounting slot is located in the avoiding slot; and the sound guide channel communicates the avoiding slot with the outside.

6. The bass automobile seat module according to claim 5, wherein two sound outlet surfaces of the double-sided sound module respectively face the two sound holes and cause the double-sided sound module and the shell to be jointly encircled into a rear sound production cavity.

7. The bass automobile seat module according to claim 6, wherein the seat comprises a seat surface and a bottom surface opposite to the seat surface; the mounting slot comprises a first mounting slot formed in a center position on the bottom surface and a plurality of second mounting slots sunken from the slot side wall of the first mounting slot towards a center direction away from the first mounting slot; the shell comprises a main body mounted in the first mounting slot and a plurality of connection parts which extend from the main body and are respectively assembled in the plurality of second mounting slots; and the sound holes are formed in the center position of the main body.

8. The bass automobile seat module according to claim 7, wherein first fixing holes are formed in the second mounting slots; second fixing holes corresponding to the first fixing holes are formed in the connection parts; and the connection parts and the second mounting slots are fixedly connected in a manner that fixing rods pass through the second fixing holes and the first fixing holes.

9. The bass automobile seat module according to claim 7, wherein gaskets are further arranged between the connection parts and the second mounting slots.

10. An automobile comprising the bass automobile seat module according to claim 1.

11. The automobile according to claim 10, wherein the first vibration diaphragm and the second vibration diaphragm have opposite vibration directions within the same time.

12. The automobile according to claim 10, wherein the first vibration diaphragm and the second vibration diaphragm have consistent vibration intensities.

13. The automobile according to claim 10, wherein the shell and a slot side wall of the mounting slot form a sound guide channel in a spacing manner.

14. The automobile according to claim 10, wherein the speaker box further comprises two sound holes which run through two opposite sides of the shell along a slot depth direction of the mounting slot; one side of the shell close to the slot bottom of the mounting slot is sunken to form an avoiding slot, and the sound hole close to the slot bottom of the mounting slot is located in the avoiding slot; and the sound guide channel communicates the avoiding slot with the outside.

15. The automobile according to claim 10, wherein two sound outlet surfaces of the double-sided sound module respectively face the two sound holes and cause the double-sided sound module and the shell to be jointly encircled into a rear sound production cavity.

16. The automobile according to claim 10, wherein the seat comprises a seat surface and a bottom surface opposite to the seat surface; the mounting slot comprises a first mounting slot formed in a center position on the bottom surface and a plurality of second mounting slots sunken from the slot side wall of the first mounting slot towards a center direction away from the first mounting slot; the shell comprises a main body mounted in the first mounting slot and a plurality of connection parts which extend from the main body and are respectively assembled in the plurality of second mounting slots; and the sound holes are formed in the center position of the main body.

17. The automobile according to claim 10, wherein first fixing holes are formed in the second mounting slots; second fixing holes corresponding to the first fixing holes are formed in the connection parts; and the connection parts and the second mounting slots are fixedly connected in a manner that fixing rods pass through the second fixing holes and the first fixing holes.

18. The automobile according to claim 10, wherein gaskets are further arranged between the connection parts and the second mounting slots.

* * * * *